(12) United States Patent
Kagami et al.

(10) Patent No.: US 11,077,886 B2
(45) Date of Patent: Aug. 3, 2021

(54) JOINT STRUCTURE FOR VEHICLE

(71) Applicant: TOYOTA JIDOSHA KABUSHIKI KAISHA, Toyota (JP)

(72) Inventors: Ayaka Kagami, Inazawa (JP); Toshinobu Takashi, Nisshin (JP); Kohei Takahashi, Nisshin (JP); Yasuhide Matsuo, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 349 days.

(21) Appl. No.: 16/130,382

(22) Filed: Sep. 13, 2018

(65) Prior Publication Data
US 2019/0135351 A1 May 9, 2019

(30) Foreign Application Priority Data
Nov. 8, 2017 (JP) .............................. JP2017-215712

(51) Int. Cl.
| | |
|---|---|
| B62D 27/02 | (2006.01) |
| B62D 25/08 | (2006.01) |
| B62D 25/02 | (2006.01) |
| F16B 17/00 | (2006.01) |
| F16B 5/00 | (2006.01) |
| F16B 5/04 | (2006.01) |

(52) U.S. Cl.
CPC ......... B62D 27/023 (2013.01); B62D 25/087 (2013.01); B62D 27/02 (2013.01);
(Continued)

(58) Field of Classification Search
CPC ...... B62D 27/00; B62D 27/02; B62D 27/023; Y10T 29/49826; Y10T 29/49835;
(Continued)

(56) References Cited

U.S. PATENT DOCUMENTS

| | | | | |
|---|---|---|---|---|
| 2005/0150259 A1* | 7/2005 | Hwang | .................... | D06F 39/12 68/3 R |
| 2015/0375795 A1* | 12/2015 | Freis | ........................ | B21J 15/36 296/191 |
| 2016/0138637 A1* | 5/2016 | Kurokawa | ................ | F16B 5/04 411/82.1 |

FOREIGN PATENT DOCUMENTS

| | | |
|---|---|---|
| CN | 203172729 U | 9/2013 |
| CN | 104943788 A | 9/2015 |
| | (Continued) | |

OTHER PUBLICATIONS

IGuchi Takamasa and Honda Motor Co LTD, "Junction Member", Nov. 2, 2015, Japanese Patent Office (Year: 2015).*
(Continued)

*Primary Examiner* — Dennis H Pedder
*Assistant Examiner* — Joyce Eileen Hill
(74) *Attorney, Agent, or Firm* — Oliff PLC

(57) ABSTRACT

There is provided a joint structure for a vehicle, the joint structure including: a plate-shaped first member; a plate-shaped second member, of which at least a portion is superposed with the first member in a plate thickness direction of the first member; plural crimped portions provided in a region at which the first member and the second member are superposed, the first member and second member being joined at the crimped portions by mechanical clinching from a side at which the first member is disposed; and a reinforcing portion provided at the first member, the reinforcing portion being inflected toward a substantially normal direction in a vicinity of the crimped portions.

10 Claims, 13 Drawing Sheets

(52) U.S. Cl.
 CPC ............... *B62D 25/02* (2013.01); *F16B 5/00* (2013.01); *F16B 5/045* (2013.01); *F16B 17/008* (2013.01)

(58) Field of Classification Search
 CPC .. Y10T 29/49837; B21D 39/03; B21D 39/20; F16B 5/045
 USPC .......................................................... 296/29
 See application file for complete search history.

(56) References Cited

FOREIGN PATENT DOCUMENTS

| | | | |
|---|---|---|---|
| CN | 105195662 A | 12/2015 | |
| DE | 102013109396 A1 * | 3/2015 | ............. F16B 5/045 |
| JP | 2014-024475 A | 2/2014 | |
| JP | 2015-189427 A | 11/2015 | |
| JP | 6166998 B2 * | 7/2017 | |

OTHER PUBLICATIONS

Heuel Gerhard and Gedia Gebrüder Dingerkus Gmbh [DE], "Process for the Production of a Component for Automobile Construction", Mar. 5, 2015, German Patent Office (Year: 2015).*

JP6166998B2, Sakamoto et al., "The dissimilar joint body and the dissimilar member joining method", Jul. 19, 2017, Japan Patent Office (Year: 2017).*

* cited by examiner

JOINT STRUCTURE FOR VEHICLE

CROSS-REFERENCE TO RELATED APPLICATION

This application is based on and claims priority under 35 USC 119 from Japanese Patent Application No. 2017-215712 filed on Nov. 8, 2017, the disclosure of which is incorporated by reference herein.

BACKGROUND

Technical Field

The present disclosure relates to a joint structure for a vehicle.

Related Art

A joint member is disclosed in Japanese Patent Application Laid-Open (JP-A) No. 2015-189427. In this joint member, a first member and a second member are superposed, mechanical clinching is applied at plural locations, from the side at which the first member is disposed, and laser welding is applied between the locations that are joined by mechanical clinching. Thus, the first member and the second member are joined together.

However, in the joint structure recited in JP-A No. 2015-189427, the first member is subject to greater plastic deformation amounts than the second member when the mechanical clinching is applied. Therefore, warping of the first member may occur. Moreover, when the welding is applied between the locations that are joined by mechanical clinching, warping may be caused by the heat of the welding.

Consequently, product precision may deteriorate due to this warping. Thus, there is scope for improvement over this conventional technology.

SUMMARY

In consideration of the circumstances described above, the present disclosure provides a joint structure for a vehicle that may improve product precision.

A joint structure for a vehicle according to a first aspect of the present disclosure includes: a plate-shaped first member; a plate-shaped second member of which at least a portion is superposed with the first member in a plate thickness direction of the first member; plural crimped portions provided in a region at which the first member and the second member are superposed, the first member and second member being joined at the crimped portions by mechanical clinching from a side at which the first member is disposed; and a reinforcing portion provided at the first member, the reinforcing portion being inflected toward a substantially normal direction in a vicinity of the crimped portions.

According to the first aspect of the present disclosure, at least a portion of the second member is superposed with the plate-shaped first member in the plate thickness direction of the first member, and the first member and second member are joined at the plural crimped portions by mechanical clinching from the side at which the first member is disposed. The reinforcing portion is provided at the first member in the vicinity of the crimped portions. The reinforcing portion is inflected toward the direction substantially normal to the first member, at which the reinforcing portion is provided. Thus, a geometrical moment of inertia in the normal direction of the first member is larger. Therefore, warping that occurs due to plastic deformation amounts at the time of mechanical clinching being greater in the first member than in the second member may be suppressed.

In a joint structure for a vehicle according to a second aspect of the present disclosure, in the first aspect, the reinforcing portion includes a pair of reinforcing portions sandwiching the crimped portions.

According to the second aspect of the present disclosure, because the reinforcing portions are provided as a pair sandwiching the crimped portions, the geometrical moment of inertia in the normal direction of the first member may be increased further in the vicinity of the reinforcing portions. Therefore, the warping associated with mechanical clinching may be further suppressed.

In a joint structure for a vehicle according to a third aspect of the present disclosure, in the first aspect, the reinforcing portion is provided at one side relative to the crimped portions in a width direction of the region at which the first member and the second member are superposed.

According to the third aspect of the present disclosure, because the reinforcing portion is provided at the one side relative to the crimped portions in the width direction of the region in which the first member and the second member are superposed, a structure may be formed that is simpler than a structure in which the reinforcing portion is provided in a pair sandwiching the crimped portions. Accordingly, weight of the first member may be reduced.

In a joint structure for a vehicle according to a fourth aspect of the present disclosure, in any one of the first to third aspects, the reinforcing portion extends along an imaginary line that linearly links the plurality of crimped portions.

According to the fourth aspect of the present disclosure, the reinforcing portion extends in parallel with the imaginary line linearly linking the plural crimped portions. Because warping associated with the mechanical clinching aggregates warping at the individual crimped portions, warping is greater in the direction along the imaginary line linearly linking the plural crimped portions. However, because the reinforcing portion extends along this imaginary line, the warping may be suppressed effectively.

In a joint structure for a vehicle according to a fifth aspect of the present disclosure, in any one of the first to fourth aspects, the reinforcing portion is inflected in the plate thickness direction of the first member toward the opposite side of the first member from a side at which the second member is disposed.

According to the fifth aspect of the present disclosure, because the reinforcing portion is inflected in the plate thickness direction of the first member toward the opposite side of the first member from the side thereof at which the second member is disposed, interference between the reinforcing portion and the second member may be avoided. Therefore, the reinforcing portion may be provided closer to the crimped portions and warping associated with the mechanical clinching may be even further suppressed.

In a joint structure for a vehicle according to a sixth aspect of the present disclosure, in any one of the first to fourth aspects, the reinforcing portion is inflected in the plate thickness direction of the first member toward a side of the first member at which the second member is disposed.

According to the sixth aspect of the present disclosure, because the reinforcing portion is inflected in the plate thickness direction of the first member toward the side thereof at which the second member is disposed, a protrusion amount of the reinforcing portion in the normal direction may be offset against a plate thickness of the second member. Therefore, a thickness in the plate thickness direction of the region in which the first member and the second member are superposed, including the reinforcing portion, may be reduced.

In a joint structure for a vehicle according to a seventh aspect of the present disclosure, in any one of the first to sixth aspects, the reinforcing portion is formed in a bead shape.

According to the seventh aspect of the present disclosure, because the reinforcing portion is formed in the bead shape, the reinforcing portion may be molded easily.

In a joint structure for a vehicle according to an eighth aspect of the present disclosure, in any one of the first to sixth aspects, the reinforcing portion is formed in a step shape.

According to the eighth aspect of the present disclosure, because the reinforcing portion is formed in the step shape, an increase in weight of the first member may be suppressed compared to a structure in which the reinforcing portion is formed in a bead shape.

The meaning of the term "step shape" as used herein is intended to include a shape in which a step-shaped difference in elevation is formed by the reinforcing portion being formed substantially in a crank shape in a sectional view orthogonal to a length direction of the reinforcing portion.

In a joint structure for a vehicle according to a ninth aspect of the present disclosure, in any one of the first to eighth aspects, the first member and the second member are formed of respectively different metals, the first member being formed of a metal with a greater Young's modulus than the second member.

According to the ninth aspect of the present disclosure, the first member and the second member are formed of respectively different metals, and the first member is formed of a metal with a greater Young's modulus than the metal forming the second member. That is, the reinforcing portion is provided at the first member that has the larger Young's modulus. Therefore, a deformation withstand load in the normal direction is higher than in a structure in which the reinforcing portion is provided at the second member. Consequently, warping associated with the mechanical clinching may be suppressed even further.

The joint structure for a vehicle according to the first aspect of the present disclosure has an excellent effect in that product precision may be improved.

The joint structure for a vehicle according to the second aspect of the present disclosure has an excellent effect in that product precision may be further improved.

The joint structure for a vehicle according to the third aspect of the present disclosure has an excellent effect in that weight may be reduced even though product precision is improved.

The joint structure for a vehicle according to the fourth aspect of the present disclosure has an excellent effect in that product precision may be improved further.

The joint structure for a vehicle according to the fifth aspect of the present disclosure has an excellent effect in that product precision may be improved even further.

The joint structure for a vehicle according to the sixth aspect of the present disclosure has an excellent effect in that layout flexibility may be improved.

The joint structure for a vehicle according to the seventh aspect of the present disclosure has an excellent effect in that fabrication costs may be suppressed.

The joint structure for a vehicle according to the eighth aspect of the present disclosure has an excellent effect in that weight may be further reduced.

The joint structure for a vehicle according to the ninth aspect of the present disclosure has an excellent effect in that product precision may be improved even further.

BRIEF DESCRIPTION OF THE DRAWINGS

Exemplary embodiments of the present disclosure will be described in detail based on the following figures, wherein.

DETAILED DESCRIPTION

First Exemplary Embodiment

Figure 1:
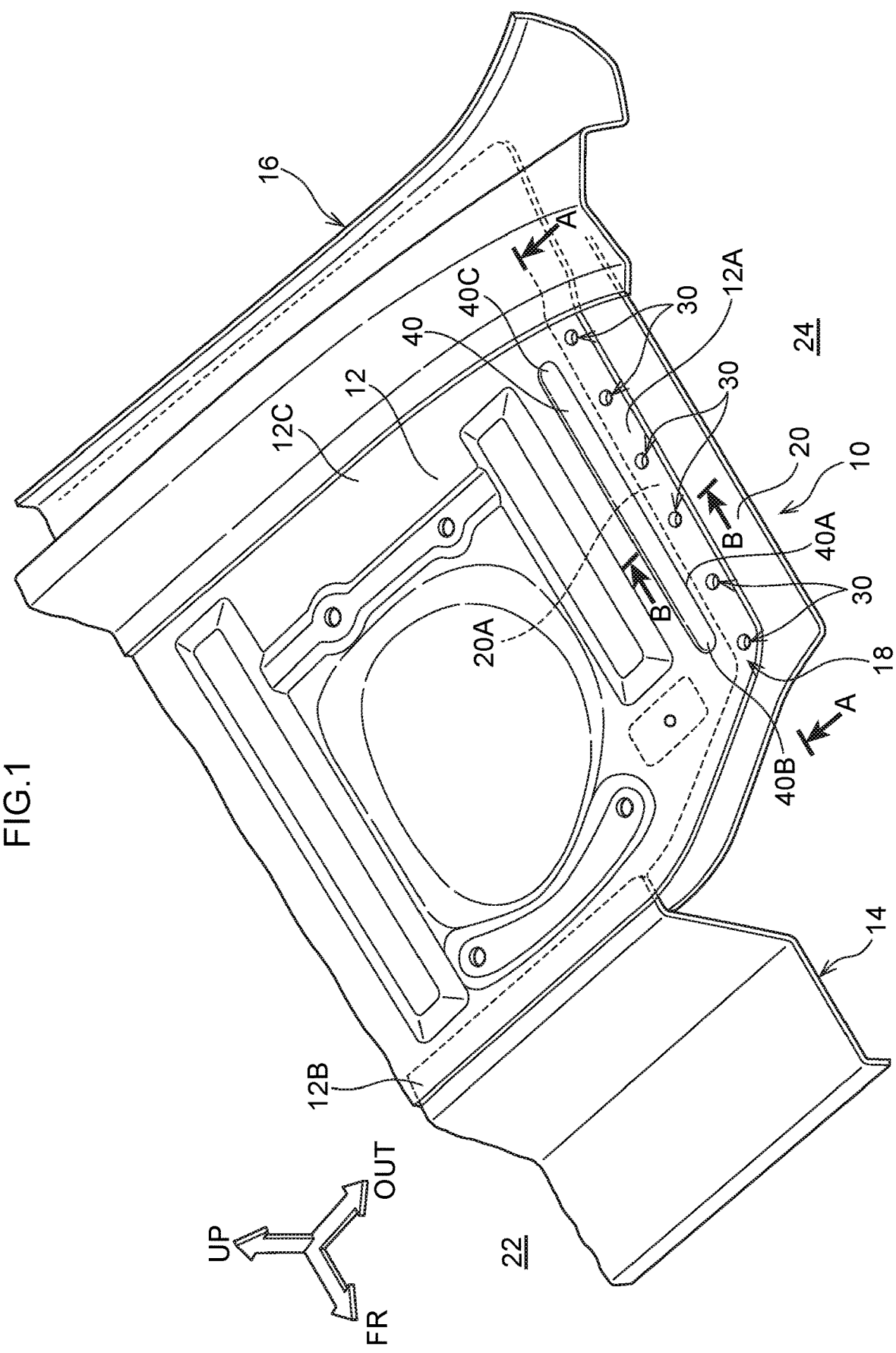
FIG. 1 is a schematic perspective view showing an upper back panel and side panel at which a joint structure for a vehicle according to a first exemplary embodiment is employed.

A joint structure for a vehicle 10 according to a first exemplary embodiment of the present disclosure is described below using FIG. 1 to FIG. 5. An arrow FR, an arrow UP and an arrow OUT that are shown where appropriate in the drawings indicate, respectively, a forward direction (progress direction) of the vehicle, an upward direction and an outward direction in the vehicle width direction. Below, where descriptions are given simply using directions to front and rear, left and right, and up and down, unless particularly specified, these refer to front and rear in the vehicle front-and-rear direction, left and right in the vehicle left-and-right direction (the vehicle width direction), and up and down in the vehicle up-and-down direction.

Structures

As shown in FIG. 1 to FIG. 5, the joint structure for a vehicle 10 according to the present exemplary embodiment is employed at an upper back structure of an automobile. This upper back structure includes an upper back panel 12, which serves as a first member, an upper back front portion 14 (below referred to as "the front portion 14"), and an upper back panel rear portion 16 (below referred to as "the rear portion 16").

The upper back panel 12 is formed in a substantially rectangular plate shape in a vehicle plan view, by press-molding of a metal plate fabricated of an aluminium alloy. The upper back panel 12 is arranged with the longer direction thereof in the vehicle width direction. A side panel 20 fabricated of steel plate serves as a second member. The upper back panel 12 is joined to the side panel 20 via a pair of left and right joint portions 18, described below, which are provided at end portions 12A at both sides of the upper back panel 12 in the vehicle width direction. The side panel 20 is joined by welding to rear pillar inner panels and the like, which are not shown in the drawings. Hence, the upper back panel 12 divides a passenger compartment 22 side thereof from a luggage compartment 24 side thereof. The upper back panel 12 need not simply be a complete rectangle but may be a complete rectangle with a shape that is curved to follow a rear window glass, which is not shown in the drawings, or the like.

The front portion 14 extends in the vehicle width direction along a front end portion 12B of the upper back panel 12. The front portion 14 is disposed close to the vehicle rear of an upper end portion of a rear seat, which is not shown in the drawings. The front portion 14 is joined to the front end portion 12B of the upper back panel 12 from the vehicle lower side thereof by a joining method that is not depicted in the drawings.

The rear portion 16 is provided at a rear end portion 12C of the upper back panel 12. The rear portion 16 extends in the vehicle width direction along the rear end portion 12C. A lower end portion of the rear window glass that is not shown in the drawings is joined to the rear portion 16 from the vehicle rear side thereof. A cross section of the rear portion 16 orthogonal to the width direction is formed substantially in a hat shape that is open toward the vehicle lower side.

Figure 2:
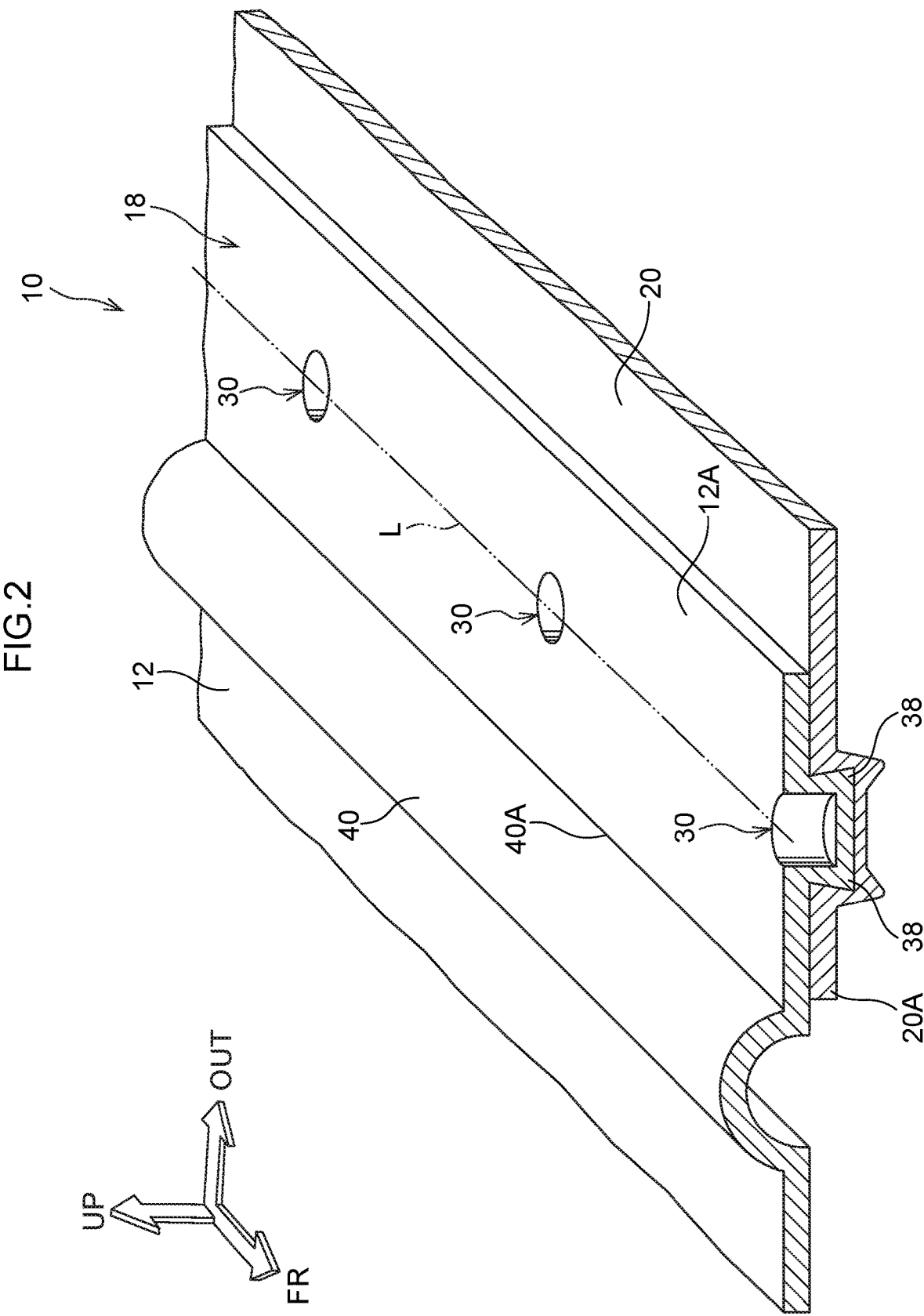
FIG. 2 is a schematic perspective view showing an enlargement of principal portions of a joint portion in FIG. 1.
Figure 3:
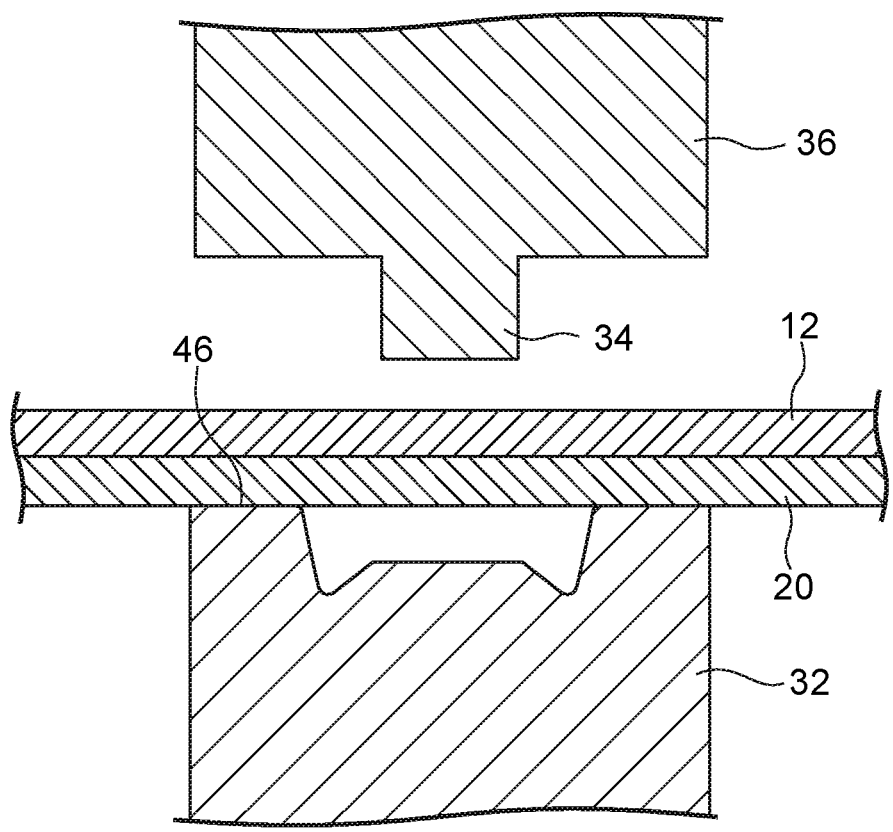
FIG. 3 is an enlarged sectional diagram showing a state of the joint structure for a vehicle according to the first exemplary embodiment prior to crimping in a crimping process.
Figure 4:
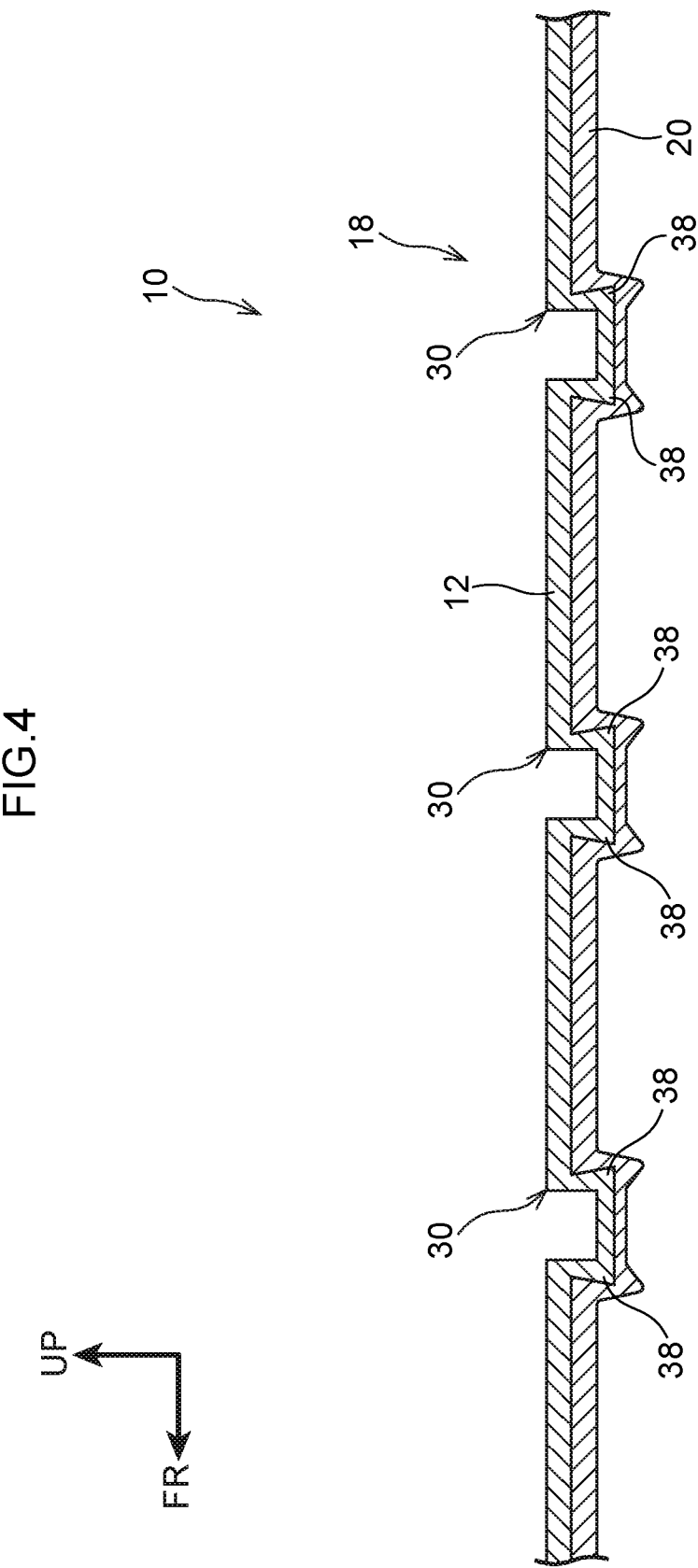
FIG. 4 is an enlarged sectional diagram showing a state cut along line A-A in FIG. 1.

The joint portion 18 is a region in which the upper back panel 12 is superposed with the side panel 20. The joint portion 18 is provided at each of the end portions 12A at both sides in the vehicle width direction of the upper back panel 12 (one of the joint portions 18 is not shown in the drawings). At the joint portion 18, as shown in FIG. 2, a portion of the side panel 20 is superposed in the plate thickness direction of the upper back panel 12 from the vehicle lower side of the upper back panel 12. Plural crimped portions 30 arranged along the vehicle front-and-rear direction are formed in the joint portion 18; the crimped portions 30 are formed at a predetermined pitch from one another (see FIG. 4). The crimped portions 30 are crimped by mechanical clinching such as TOX (registered trademark) joining or the like. In this mechanical clinching, as shown in FIG. 3, the upper back panel 12 and side panel 20 are superposed and back-supported by a die 32 that corresponds to a receiving-side jig without protruding portions. A punch 36 corresponds to a pressing-side jig, including a protruding portion 34. The upper back panel 12 and side panel 20 are joined by the punch 36 locally pushing from the side at which the upper back panel 12 is disposed toward the side at which the side panel 20 is disposed. In consequence, the side panel 20 and upper back panel 12 are plastically deformed such that the upper back panel 12 tightly fits in the side panel 20, as shown in FIG. 2 and FIG. 4. Thus, an interlocked portion 38 is formed and the upper back panel 12 and side panel 20 are joined together. Each crimped portion 30 has an indentation shape that is circular in a plan view.

As shown in FIG. 2, a reinforcing portion 40 is formed at the upper back panel 12. The reinforcing portion 40 is formed to along an imaginary line L that linearly links the plural crimped portions 30 with one another. The reinforcing portion 40 is formed in a bead shape that protrudes toward the vehicle upper side. In other words, the reinforcing portion 40 is inflected toward a normal direction of the upper back panel 12.

Figure 5:
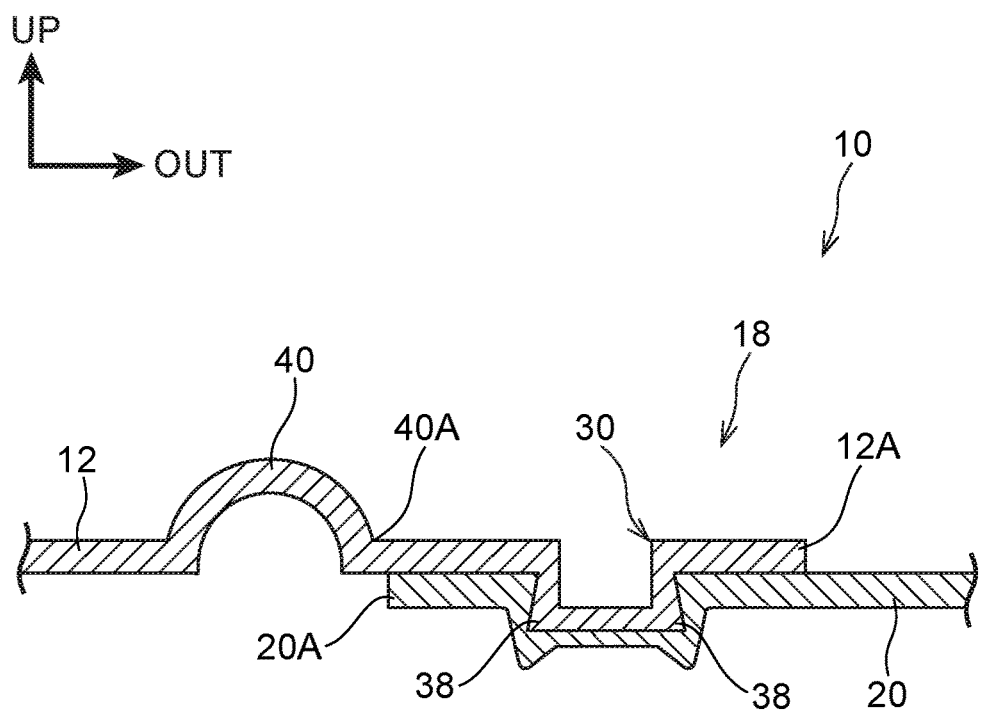
FIG. 5 is an enlarged sectional diagram showing a state cut along line B-B in FIG. 1.

As shown in FIG. 5, the reinforcing portion 40 is formed in a vicinity of the crimped portions 30 at one side in the width direction of the joint portion 18 relative to the crimped portions 30. To be specific, an end portion 40A at the vehicle width direction outer side of the reinforcing portion 40 is formed in the upper back panel 12 so as to be disposed in the vicinity of a position corresponding with an end portion 20A at the vehicle width direction inner side of the side panel 20. A dimension of the side panel 20 from the crimped portions 30 to the end portion 20A is substantially the same as a minimum dimension of a flat surface that is required when the mechanical clinching is being applied (the dimension of a flat portion 46 of the die 32 shown in FIG. 3). The end portion 40A of the reinforcing portion 40 may be disposed at a position matching the end portion 20A of the side panel 20 in a vehicle plan view.

As shown in FIG. 1, a front end portion 40B of the reinforcing portion 40 is formed at a position separated to the vehicle rear side from the front end portion 12B of the upper back panel 12, and a rear end portion 40C of the reinforcing portion 40 is formed at a position separated to the vehicle front side from the rear end portion 12C of the upper back panel 12.

—Operation and Effects of the First Exemplary Embodiment—

Now, operation and effects of the present exemplary embodiment are described.

In the present exemplary embodiment, as shown in FIG. 1, the plate-shaped upper back panel 12 and the side panel 20, of which at least a portion is superposed in the plate thickness direction of the upper back panel 12 so that an external edge of the side panel 20 remains spaced from an external edge of the upper back panel 12 when viewed from the plate thickness direction of the upper back panel 12, are joined together by mechanical clinching of the plural crimped portions 30 from the side thereof at which the upper back panel 12 is disposed. The reinforcing portion 40 is provided at the upper back panel 12 in a vicinity of the crimped portions 30, and the reinforcing portion 40 is inflected toward the substantially normal direction of the upper back panel 12 at which the reinforcing portion 40 is provided. A protruding portion of the reinforcing portion 40 is spaced from the external edge of the side panel 20 such that the protruding portion of the reinforcing portion 40 does not overlap the side panel 20 when viewed from the plate thickness direction of the upper back panel 12. Thus, a geometrical moment of inertia in the normal direction of the upper back panel 12 is increased. Therefore, warping that occurs due to plastic deformation amounts at the time of mechanical clinching being greater in the upper back panel 12 than in the side panel 20 may be suppressed. As a result, product precision may be improved.

Because the reinforcing portion 40 is provided at one side in the width direction of the joint portion 18 relative to the crimped portions 30 (at the vehicle width direction inner side relative to the crimped portions 30), the reinforcing portion 40 may be formed with a relatively simple structure. Accordingly, weight of the upper back panel 12 may be reduced. Therefore, weight may be reduced even though product precision is improved.

As shown in FIG. 2, the reinforcing portion 40 extends to follow the imaginary line L that linearly links the plural crimped portions 30. Because warping associated with the mechanical clinching aggregates warping at the individual crimped portions 30, warping is greater in the direction along the imaginary line L linearly linking the plural crimped portions 30. However, because the reinforcing portion 40 extends along the imaginary line L, the warping may be suppressed effectively. As a result, product precision may be improved further.

The reinforcing portion 40 of the upper back panel 12 is inflected in the plate thickness direction of the upper back panel 12 toward the opposite side of the upper back panel 12 from the side thereof at which the side panel 20 is disposed. Therefore, interference between the reinforcing portion 40 and the side panel 20 may be avoided. Accordingly, the reinforcing portion 40 may be provided closer to the crimped portions 30 and warping associated with the mechanical clinching may be even further suppressed. As a result, product precision may be improved even further.

Because the reinforcing portion 40 is formed in a bead shape, the reinforcing portion 40 may be molded easily. Thus, fabrication costs may be suppressed.

The reinforcing portion 40 is provided only at the upper back panel 12. That is, the reinforcing portion 40 is formed at only one of the members that are joined. Thus, when different metal materials are joined together, even if joining by welding or the like is not applied, joining is possible even while product precision is improved in the present exemplary embodiment.

The reinforcing portion 40 according to the present exemplary embodiment described above is provided at the vehicle width direction inner side relative to the crimped portions 30 but this is not limiting. Structures are possible in which the reinforcing portion 40 is provided at the vehicle width direction outer side relative to the crimped portions 30.

Figure 6:
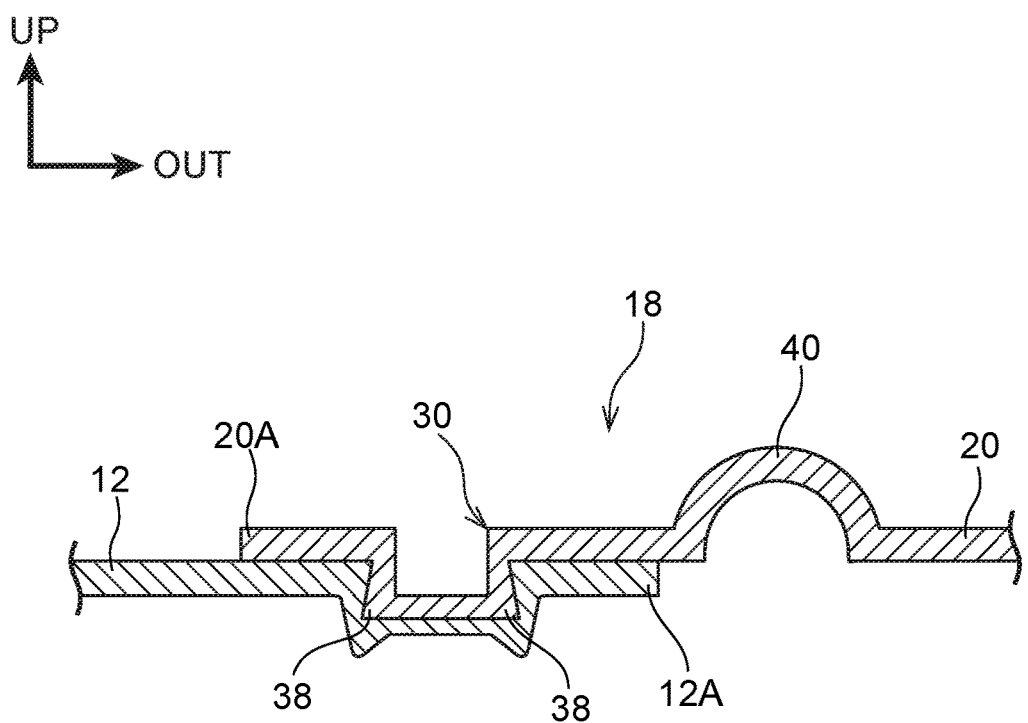
FIG. 6 is an enlarged sectional diagram, corresponding to FIG. 5, showing a joint portion at which a joint structure for a vehicle according to a variant example of the first exemplary embodiment is employed.

The joint portion 18 according to the present exemplary embodiment described above has a structure in which the side panel 20 is superposed in the plate thickness direction of the upper back panel 12 from the vehicle lower side of the upper back panel 12, crimping is applied from the side at which the upper back panel 12 is disposed, and the reinforcing portion 40 is formed at the upper back panel 12, but this is not limiting. As illustrated in FIG. 6, a structure is possible in which the side panel 20 serves as the first member and the upper back panel 12 serves as the second member, the upper back panel 12 is superposed in the plate thickness direction of the side panel 20 (and the upper back panel 12) from the vehicle lower side of the side panel 20, the crimping is applied from the side at which the side panel 20 is disposed, and the reinforcing portion 40 is formed at the side panel 20.

Figure 7:
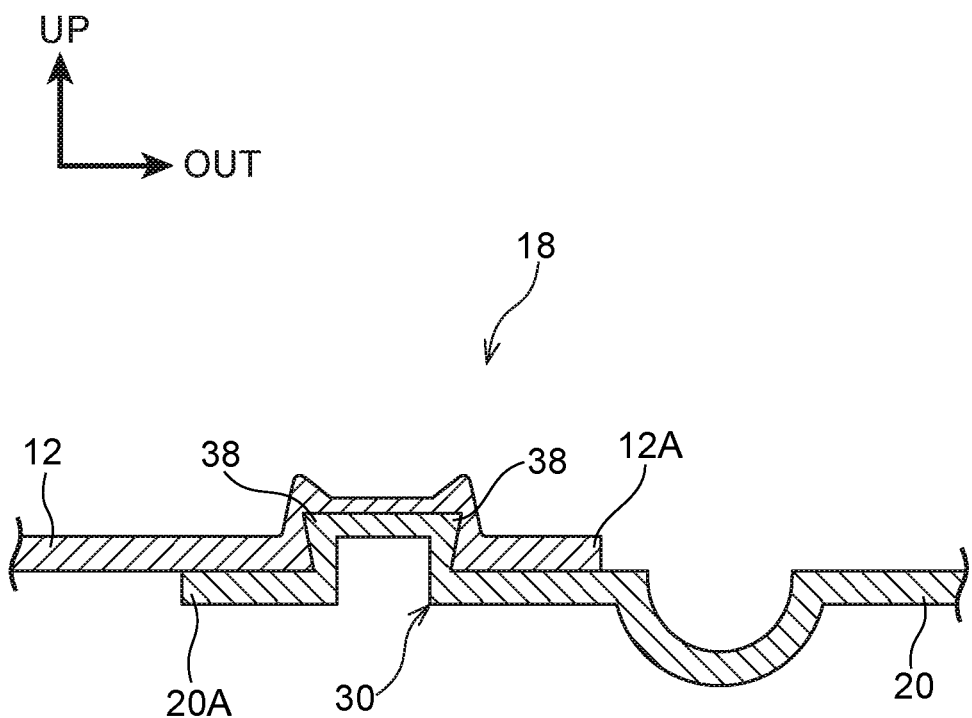
FIG. 7 is an enlarged sectional diagram, corresponding to FIG. 5, showing a joint portion at which a joint structure for a vehicle according to another variant example of the first exemplary embodiment is employed.

Further, as illustrated in FIG. 7, the crimping of the crimped portions 30 may be applied from the side at which the side panel 20 is disposed toward the vehicle upper side, and the reinforcing portion 40 may be a bead structure that is formed at the side panel 20 and protrudes toward the vehicle lower side.

Figure 8:
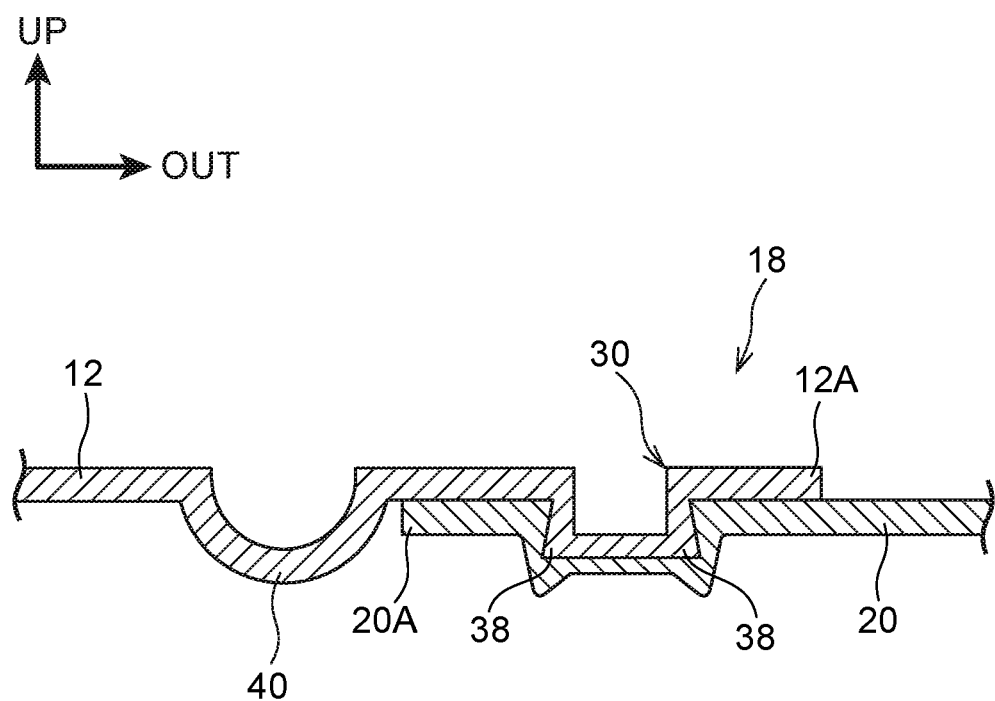
FIG. 8 is an enlarged sectional diagram, corresponding to FIG. 5, showing a joint portion at which a joint structure for a vehicle according to still another variant example of the first exemplary embodiment is employed.

As illustrated in FIG. 8, the reinforcing portion 40 formed at the upper back panel 12 may be a bead structure that protrudes to the side at which the side panel 20 is disposed, which is to say, in the same direction as the crimping direction of the crimped portions 30 (from the vehicle upper side toward the vehicle lower side). In this case, because the reinforcing portion 40 is inflected toward the side at which the side panel 20 is disposed in the plate thickness direction of the upper back panel 12, a protrusion amount of the reinforcing portion 40 in the normal direction is offset against the plate thickness of the side panel 20. Therefore, a thickness of the upper back panel 12 and the side panel 20, including the reinforcing portion 40, in the plate thickness direction of the joint portion 18 may be reduced. Accordingly, layout flexibility for the joint portion 18 itself and for components in the vicinity of the joint portion 18 may be improved.

Second Exemplary Embodiment

Figure 9:
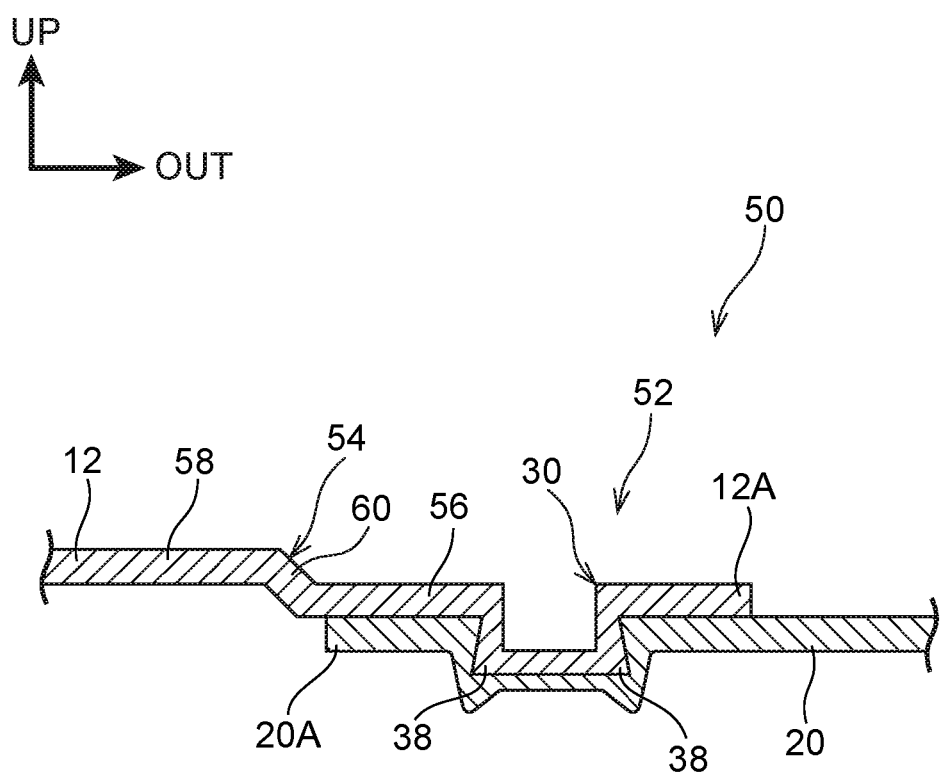
FIG. 9 is an enlarged sectional diagram, corresponding to FIG. 5, showing a joint portion at which a joint structure for a vehicle according to a second exemplary embodiment is employed.

A joint structure for a vehicle 50 according to a second exemplary embodiment of the present disclosure is described below using FIG. 9 and FIG. 10. Structural portions that are basically the same as in the first exemplary embodiment described above are assigned the same reference symbols, and descriptions thereof are not given.

A joint portion 52 at which the joint structure for a vehicle 50 according to the second exemplary embodiment is employed is similar in basic structure to the first exemplary embodiment but features a reinforcing portion 54 that is formed in a step shape.

Figure 10:
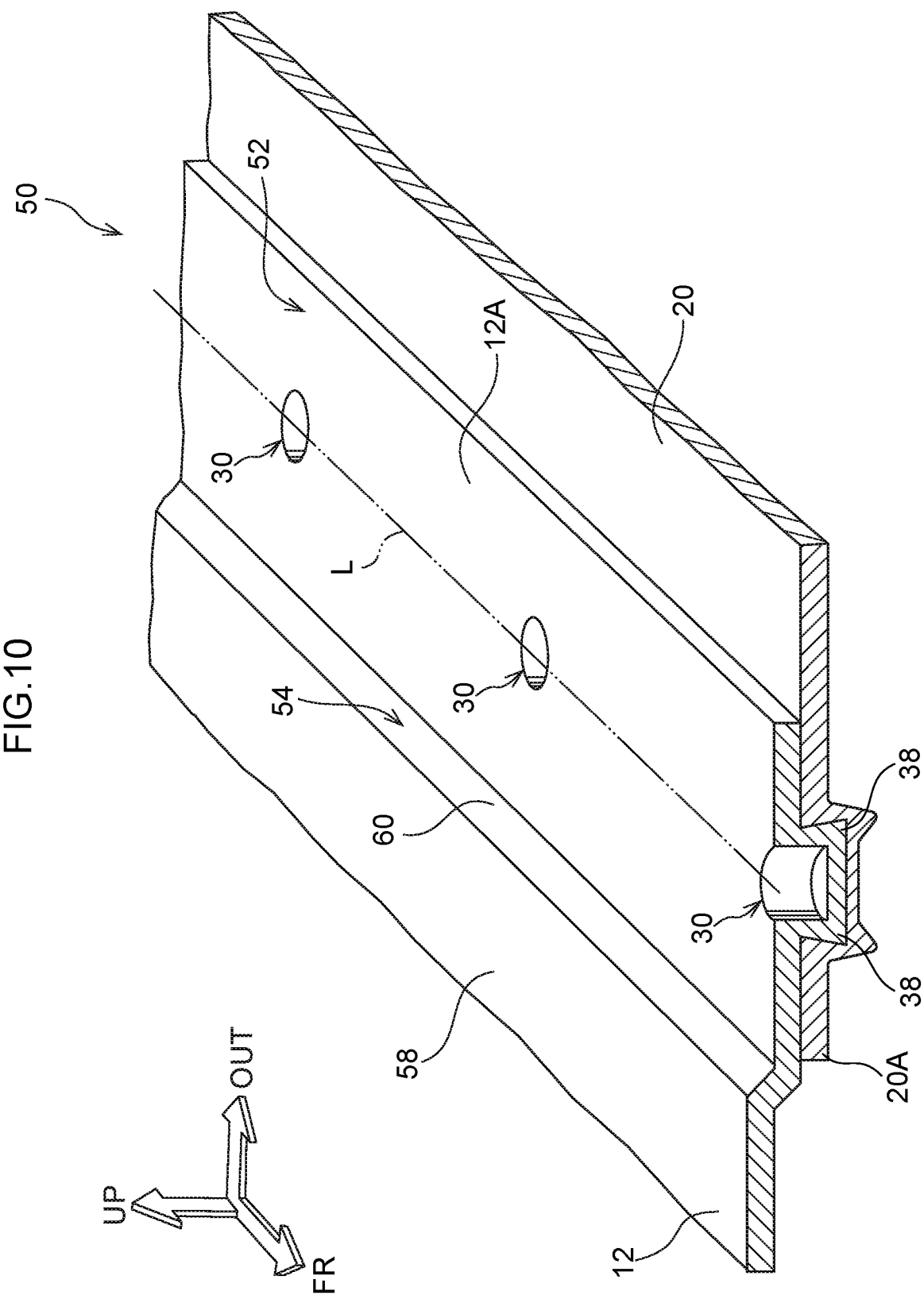
FIG. 10 is a schematic perspective view, corresponding to FIG. 2, showing a joint portion at which the joint structure for a vehicle according to the second exemplary embodiment is employed.

That is, as shown in FIG. 10, the joint portion 52 is provided at each of the end portions 12A at both sides in the vehicle width direction of the upper back panel 12 (one of the joint portions 52 is not shown in the drawings). At the joint portion 52, a portion of the side panel 20 is superposed in the plate thickness direction of the upper back panel 12 from the vehicle lower side of the upper back panel 12. The plural crimped portions 30 are formed in the joint portion 52 along the vehicle front-and-rear direction. The crimped portions 30 are formed at a predetermined pitch from one another.

The reinforcing portion 54 is formed at the upper back panel 12 to follow the imaginary line L that linearly links the plural crimped portions 30 with one another. The reinforcing portion 54 is formed in the step shape, including a first wall portion 56, a second wall portion 58, and a connecting wall portion 60. The crimped portions 30 are formed in the first wall portion 56. The second wall portion 58 is substantially parallel in the plate thickness direction with the first wall portion 56 and is disposed at the vehicle upper side relative to the first wall portion 56. The connecting wall portion 60 connects a vehicle width direction inner side end portion of the first wall portion 56 with a vehicle width direction outer side end portion of the second wall portion 58. Accordingly, the connecting wall portion 60 is angled to the vehicle upper side toward the vehicle width direction inner side (see FIG. 9). That is, a step-shaped difference in elevation is formed by the reinforcing portion 54 being formed substantially in a crank shape in the vehicle vertical direction. Thus, the reinforcing portion 54 is inflected in the substantially normal direction of the upper back panel 12.

—Operation and Effects of the Second Exemplary Embodiment—

Now, operation and effects of the present exemplary embodiment are described.

The structure described above has a similar structure to the joint structure for a vehicle 10 according to the first exemplary embodiment apart from the reinforcing portion 54 being formed in the step shape. Thus, similar effects to the first exemplary embodiment are provided. In addition, compared to the bead-shaped reinforcing portion 40 shown in FIG. 2, the present exemplary embodiment may suppress an increase in weight of the upper back panel 12. That is, in the case of the bead-shaped reinforcing portion 40, in a sectional view orthogonal to the length direction of the reinforcing portion 40, the reinforcing portion 40 is formed in a substantially semi-circular shape protruding in the normal direction from the upper back panel 12. In contrast, the reinforcing portion 54 according to the present exemplary embodiment is formed in a crank shape in the vehicle vertical direction. Therefore, an amount of steel plate used for forming the reinforcing portion 54 may be smaller than for the bead structure. Thus, weight may be reduced further.

The reinforcing portion 54 is formed in the step shape that protrudes toward the vehicle upper side but this is not limiting; the reinforcing portion 54 may be formed in a step shape that protrudes toward the vehicle lower side.

Moreover, the reinforcing portion 54 is provided at the vehicle width direction inner side relative to the crimped portions 30 but this is not limiting. Structures are possible in which the reinforcing portion 54 is provided at the vehicle width direction outer side relative to the crimped portions 30.

Third Exemplary Embodiment

Figure 11:
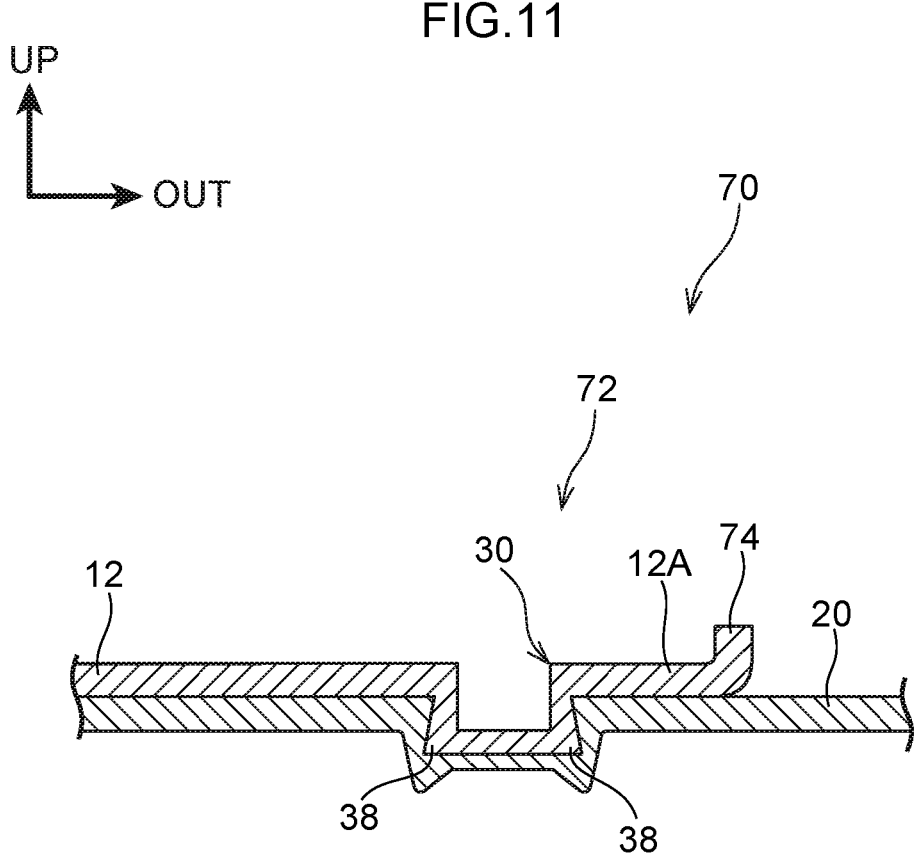
FIG. 11 is an enlarged sectional diagram, corresponding to FIG. 5, showing a joint portion at which a joint structure for a vehicle according to a third exemplary embodiment is employed.

A joint structure for a vehicle 70 according to a third exemplary embodiment of the present disclosure is described below using FIG. 11 and FIG. 12. Structural portions that are basically the same as in the first exemplary embodiment described above are assigned the same reference symbols, and descriptions thereof are not given.

A joint portion 72 at which the joint structure for a vehicle 70 according to the third exemplary embodiment is employed is similar in basic structure to the first exemplary embodiment but features a reinforcing portion 74 that is formed in a flange shape.

Figure 12:
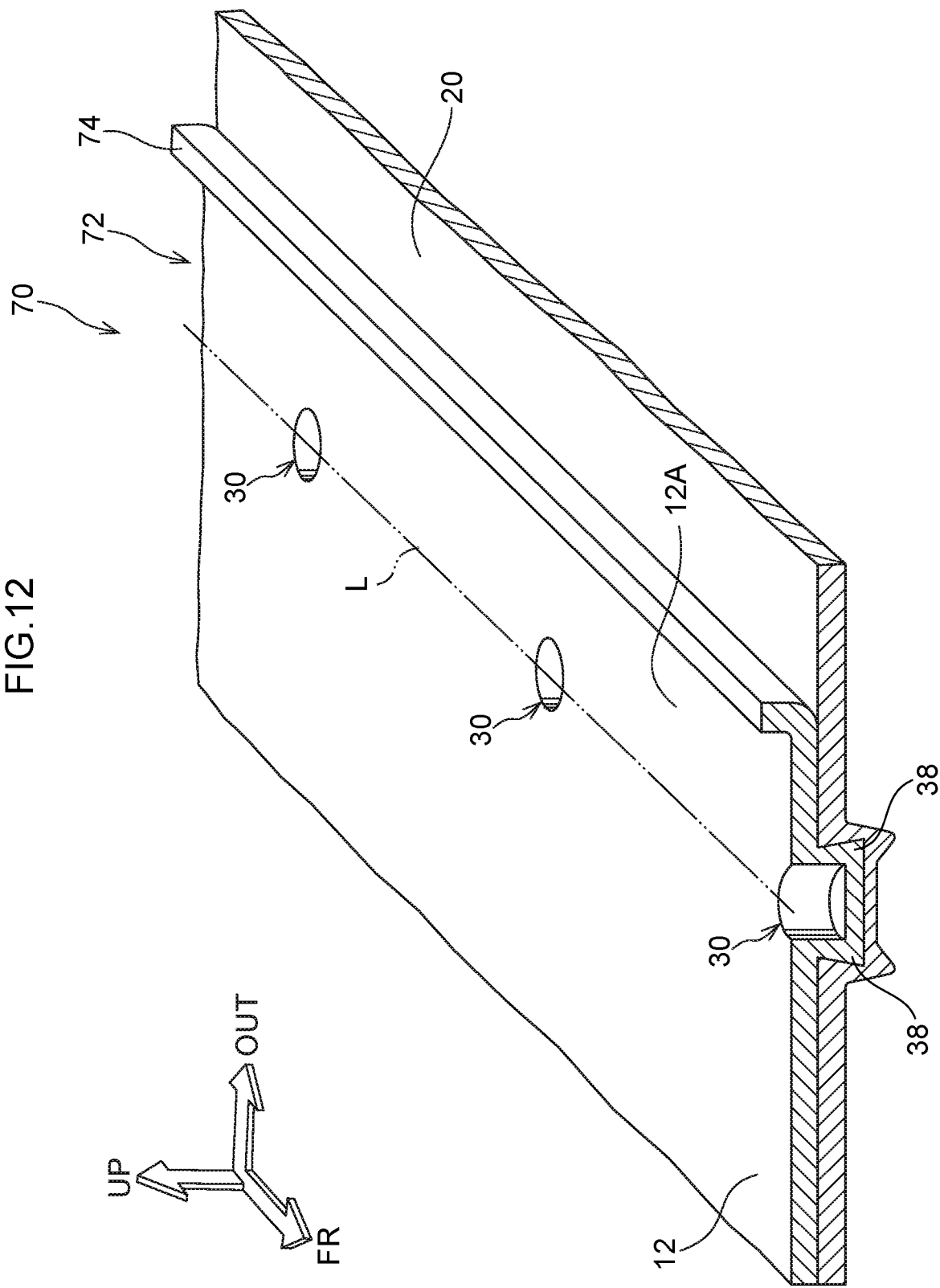
FIG. 12 is a schematic perspective view, corresponding to FIG. 2, showing the joint portion at which the joint structure for a vehicle according to the third exemplary embodiment is employed.

That is, as shown in FIG. 12, the joint portion 72 is provided at each of the end portions 12A at both sides in the vehicle width direction of the upper back panel 12 (one of the joint portions 72 is not shown in the drawings). At the joint portion 72, a portion of the side panel 20 is superposed in the plate thickness direction of the upper back panel 12 from the vehicle lower side of the upper back panel 12. The plural crimped portions 30 are formed in the joint portion 72 along the vehicle front-and-rear direction. The crimped portions 30 are formed at a predetermined pitch from one another. As an example, the upper back panel 12 according to the present exemplary embodiment is formed of steel plate, and the side panel 20 is formed of metal plate fabricated of an aluminium alloy.

The reinforcing portion 74 is formed at the end portion at the vehicle width direction outer side of the upper back panel 12 to follow the imaginary line L that linearly links the plural crimped portions 30 with one another. The reinforcing portion 74 is formed in the flange shape, which protrudes toward the vehicle upper side (see FIG. 11). In other words, the reinforcing portion 74 is inflected toward the substantially normal direction of the upper back panel 12.

—Operation and Effects of the Third Exemplary Embodiment—

Now, operation and effects of the present exemplary embodiment are described.

The structure described above has a similar structure to the joint structure for a vehicle 10 according to the first exemplary embodiment apart from the reinforcing portion 74 being formed in the flange shape. Thus, similar effects to the first exemplary embodiment are provided. In addition, the upper back panel 12 and the side panel 20 are formed of respectively different metals, the upper back panel 12 (fabricated of steel plate) being formed of a metal with a greater Young's modulus than the side panel 20 (fabricated of an aluminium alloy). That is, the reinforcing portion 74 is provided at the upper back panel 12 that has the larger Young's modulus. Therefore, a deformation withstand load in the normal direction is higher than in a structure in which the reinforcing portion 74 is provided at the side panel 20. Consequently, warping associated with the mechanical clinching may be suppressed even further. Hence, product precision may be improved even further.

Fourth Exemplary Embodiment

A joint structure for a vehicle 80 according to a fourth exemplary embodiment of the present disclosure is described below using FIG. 14. Structural portions that are basically the same as in the first exemplary embodiment described above are assigned the same reference symbols, and descriptions thereof are not given.

A joint portion 82 at which the joint structure for a vehicle 80 according to the fourth exemplary embodiment is employed is similar in basic structure to the first exemplary embodiment but features a reinforcing portion 84 that is also formed between the plural crimped portions 30.

Figure 14:
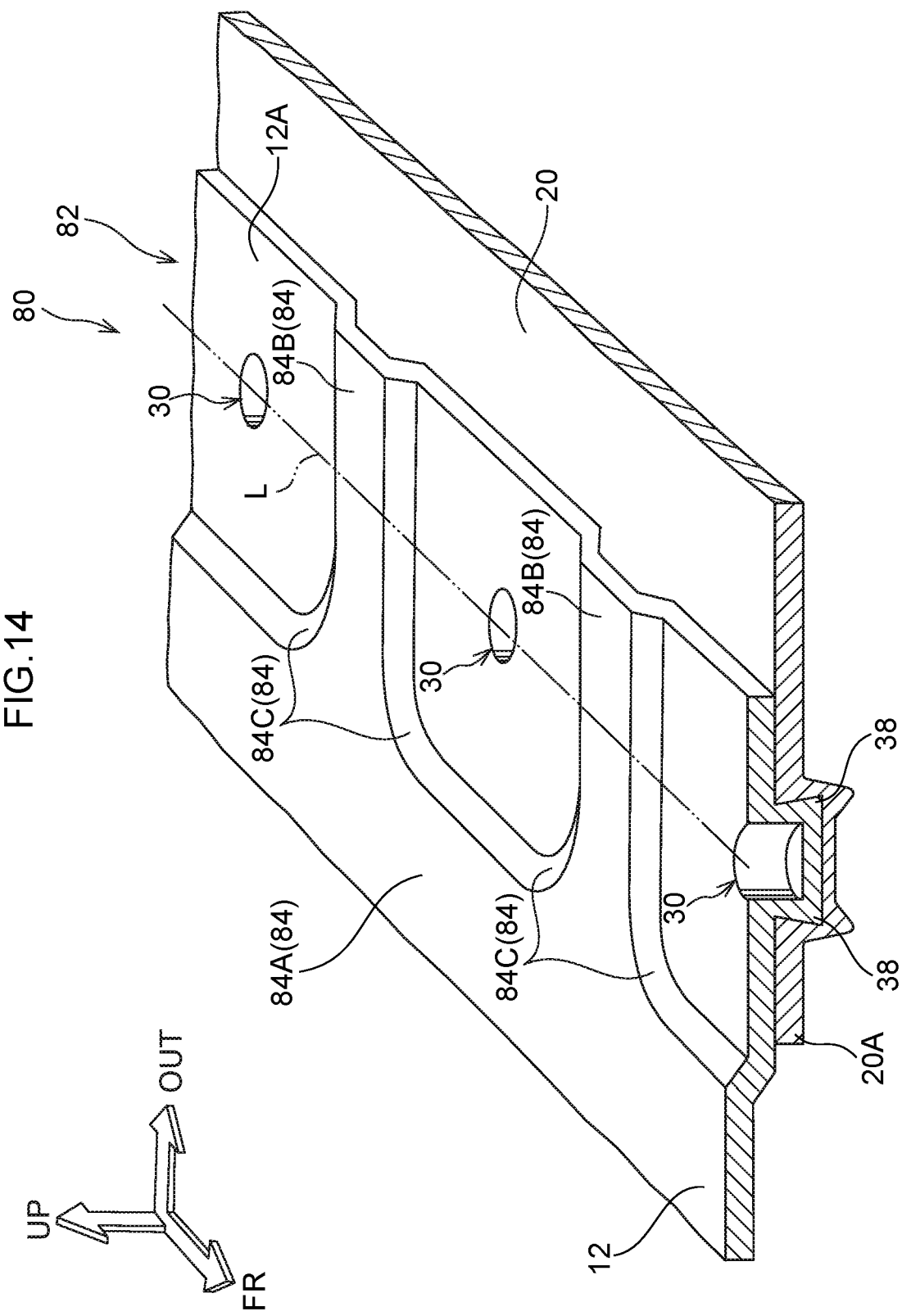
FIG. 14 is a schematic perspective view, corresponding to FIG. 2, showing a joint portion at which a joint structure for a vehicle according to a fourth exemplary embodiment is employed.

That is, as shown in FIG. 14, the joint portion 82 is provided at each of the end portions 12A at both sides in the vehicle width direction of the upper back panel 12 (one of the joint portions 82 is not shown in the drawing). At the joint portion 82, a portion of the side panel 20 is superposed in the plate thickness direction of the upper back panel 12 from the vehicle lower side of the upper back panel 12. The plural crimped portions 30 are formed in the joint portion 82 along the vehicle front-and-rear direction. The crimped portions 30 are formed at a predetermined pitch from one another.

The reinforcing portion 84 is formed at the upper back panel 12 in a step shape. The reinforcing portion 84 includes first reinforcing portions 84A and second reinforcing portions 84B. Each first reinforcing portion 84A is disposed at the end portion 12A in the vehicle width direction of the upper back panel 12, at the vehicle width direction inner side of the corresponding crimped portion 30. The first reinforcing portions 84A extend to follow the imaginary line L that linearly links the crimped portions 30 with one another. The second reinforcing portions 84B extend substantially in the vehicle width direction between the plural crimped portions 30. The first reinforcing portions 84A and second reinforcing portions 84B are each formed to protrude to the vehicle upper side. That is, the reinforcing portion 84 is inflected toward the substantially normal direction of the upper back panel 12. The reinforcing portion 84 is formed at the upper back panel 12 to assure a minimum dimension of a flat surface that is required when implementing the mechanical clinching of the crimped portions 30 (a dimension of the flat portion 46 of the die 32 shown in FIG. 3).

Figure 15:
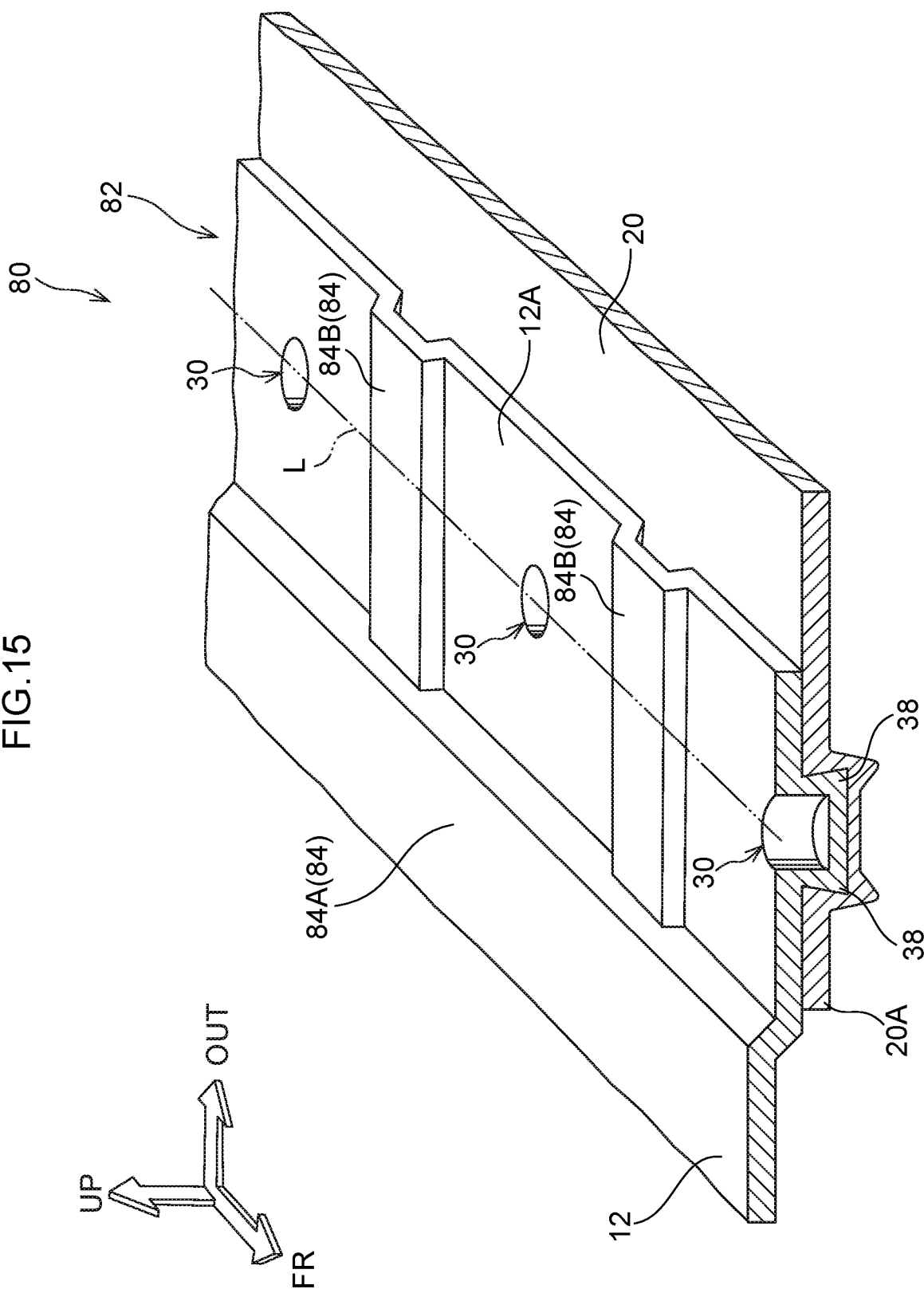
FIG. 15 is a schematic perspective view, corresponding to FIG. 2, showing a joint portion at which a joint structure for a vehicle according to a variant example of the fourth exemplary embodiment is employed.

The first reinforcing portions 84A and second reinforcing portions 84B are formed integrally. Connecting portions 84C between the first reinforcing portions 84A and the second reinforcing portions 84B are formed in curve shapes. Although the connecting portions 84C between the first reinforcing portions 84A and second reinforcing portions 84B are formed in the curve shapes in the present exemplary embodiment, this is not limiting. As shown in FIG. 15, a structure is possible in which the second reinforcing portions 84B are abuttingly connected with the first reinforcing portions 84A ("back cut").

—Operation and Effects of the Fourth Exemplary Embodiment—

Now, operation and effects of the present exemplary embodiment are described.

As shown in FIG. 14, the structure described above has a similar structure to the joint structure for a vehicle 10 according to the first exemplary embodiment apart from the reinforcing portion 84 being formed also between the plural crimped portions 30. Thus, similar effects to the first exemplary embodiment are provided. In addition, because the second reinforcing portions 84B of the reinforcing portion 84 are formed between the plural crimped portions 30, the geometrical moment of inertia of the upper back panel 12 may be increased both in the vehicle front-and-rear direction and in the vehicle width direction. Therefore, warping that occurs at the time of mechanical clinching of the crimped portions 30 may be suppressed even further.

In the fourth exemplary embodiment described above, the reinforcing portion 84 is formed in a step shape but this is not limiting; the reinforcing portion 84 may be formed in a bead shape.

In the first to fourth exemplary embodiments described above, the joint structure for a vehicle 10, 50, 70 or 80 is applied to the joint portion 18, 52, 72 or 82 between the upper back panel 12 and the side panel 20, but this is not limiting. These joint structures for a vehicle may be applied to joint portions of alternative members and locations.

Figure 13:
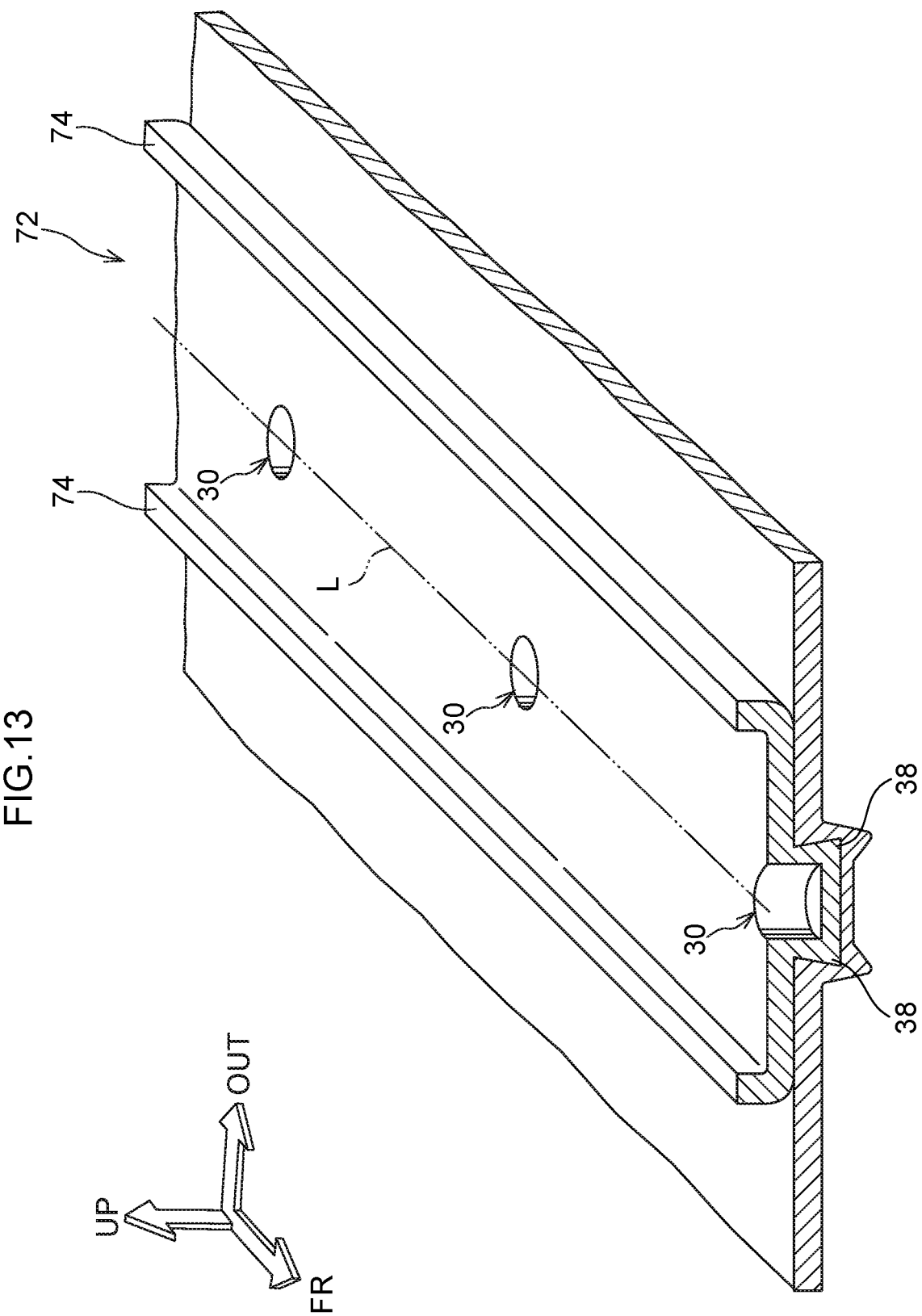
FIG. 13 is a schematic perspective view, corresponding to FIG. 2, showing a joint portion at which a joint structure for a vehicle according to a variant example of the third exemplary embodiment is employed.

The reinforcing portion 40, 54, 74 or 84 is provided at one side in the width direction of the joint portion 18, 52, 72 or 82 relative to the crimped portions 30, but this is not limiting. For example, as shown in FIG. 13, the reinforcing portion may be provided in a pair sandwiching the crimped portions 30. In the structure shown in FIG. 13, the geometrical moment of inertia in the normal direction of the member at which the reinforcing portions 74 are formed may be further increased. Therefore warping associated with the mechanical clinching may be further suppressed and product precision may be further improved. Note that FIG. 13 shows the reinforcing portions 74 but, obviously, an alternative of the reinforcing portions 40, 50 and 84 may be provided in a pair sandwiching the crimped portions 30.

The upper back panel 12 and the side panel 20 are formed of respectively different metal materials, but this is not limiting; the members may be formed of the same material. Furthermore, the members are not limited to an aluminium alloy and steel plate but may be formed of alternative metal materials.

The reinforcing portions 40, 54, 74 and 84 extend to follow the imaginary line L but this is not limiting. The reinforcing portions 40, 54, 74 and 84 may be formed in respective vicinities of the individual crimped portions 30. Alternative structures are also possible.

The present disclosure is not limited by the above recitations. In addition to the above recitations, it will be clear that numerous modifications may be embodied within a technical scope not departing from the gist of the disclosure.

What is claimed is:

1. A joint structure for a vehicle, the joint structure composing:
    a plate-shaped first member;
    a plate-shaped second member with substantially parallel external and internal edges, of which at least a portion is superposed with the first member in a plate thickness direction of the first member so that the external edge of the second member remains spaced from an external edge of the first member when viewed from the plate thickness direction of the first member;
    a plurality of crimped portions provided in a flat region at which the first member and the second member are superposed, the first member and second member being joined at the crimped portions by mechanical clinching from a side at which the first member is disposed; and
    a reinforcing portion provided at the first member, the reinforcing portion being inflected toward a substantially normal direction in a vicinity of the crimped portions, and a protruding portion of the reinforcing portion is spaced from both the external and internal edges of the second member such that the protruding portion of the reinforcing portion does not overlap the second member when viewed from the plate thickness direction of the first member.

2. The joint structure for a vehicle according to claim 1, wherein the reinforcing portion comprises a pair of reinforcing portions sandwiching the crimped portions.

3. The joint structure for a vehicle according to claim 1, wherein the reinforcing portion is provided at one side, relative to the crimped portions, in a width direction of the region at which the first member and the second member are superposed.

4. The joint structure for a vehicle according to claim 1, wherein the reinforcing portion extends along an imaginary line that linearly links the plurality of crimped portions.

5. The joint structure for a vehicle according to claim 1, wherein the reinforcing portion is inflected in the plate thickness direction of the first member toward an opposite side of the first member from a side at which the second member is disposed.

6. The joint structure for a vehicle according to claim 1, wherein the reinforcing portion is inflected in the plate thickness direction of the first member toward a side of the first member at which the second member is disposed.

7. The joint structure for a vehicle according to claim 1, wherein the reinforcing portion is formed in a bead shape.

8. The joint structure for a vehicle according to claim 1, wherein the reinforcing portion is formed in a step shape.

9. The joint structure for a vehicle according to claim 1, wherein the first member and the second member are formed of respectively different metals, the first member being formed of a metal with a greater Young's modulus than the second member.

10. The joint structure for a vehicle according to claim 1, wherein:
   the external edge of the first member and the external edge of the second member are linear external edges, and
   the flat region is defined by two of the linear external edges of: (i) the first member and the second member, respectively, or (ii) either one of the first member or the second member, when viewed from the plate thickness direction of the first member.

* * * * *